United States Patent
Emelko et al.

(10) Patent No.: US 9,513,872 B2
(45) Date of Patent: Dec. 6, 2016

(54) RANDOM NUMBER GENERATOR

(75) Inventors: Glenn A. Emelko, Concord Township, OH (US); Gregory B. Gillooly, Cleveland Heights, OH (US)

(73) Assignee: ACLARA TECHNOLOGIES LLC, Hazelwood, MO (US)

( * ) Notice: Subject to any disclaimer, the term of this patent is extended or adjusted under 35 U.S.C. 154(b) by 816 days.

(21) Appl. No.: 13/511,405

(22) PCT Filed: Nov. 18, 2010

(86) PCT No.: PCT/US2010/057245
§ 371 (c)(1),
(2), (4) Date: Sep. 26, 2012

(87) PCT Pub. No.: WO2011/102866
PCT Pub. Date: Aug. 25, 2011

(65) Prior Publication Data
US 2013/0013657 A1    Jan. 10, 2013

Related U.S. Application Data

(60) Provisional application No. 61/264,625, filed on Nov. 25, 2009.

(51) Int. Cl.
*G06F 7/58* (2006.01)
(52) U.S. Cl.
CPC ............... *G06F 7/588* (2013.01); *G06F 7/58* (2013.01); *G06F 7/582* (2013.01)
(58) Field of Classification Search
CPC .......................................... G06F 7/582–7/586
USPC .................................................. 708/250–256
See application file for complete search history.

(56) References Cited

U.S. PATENT DOCUMENTS

| | | | | |
|---|---|---|---|---|
| 3,761,696 A | * | 9/1973 | Russell | ................... G06F 7/584 331/78 |
| 5,222,142 A | | 6/1993 | Kent | |
| 5,706,218 A | * | 1/1998 | Hoffman | ....................... 708/251 |
| 6,253,223 B1 | * | 6/2001 | Sprunk | ................... G06F 7/582 708/250 |

(Continued)

FOREIGN PATENT DOCUMENTS

JP    2006139756    6/2006

OTHER PUBLICATIONS

Yanfang Wang and Haibin Shen, "The simulation model and ASIC implementation of a random bit source circuit," IEEE 8th International Conference on ASIC, pp. 139-142, Oct. 2009.*

(Continued)

*Primary Examiner* — Matthew Sandifer
(74) *Attorney, Agent, or Firm* — Polsinelli PC

(57) ABSTRACT

A system is described for generating random numbers. The system may include a plurality of information sources and one or more sampling devices coupled to each of the information sources. Each information source may have a characteristic which may differ from the characteristic of any other information source. The sampling devices may sample the information sources at some sampling interval. A sample value may be captured from each of the information sources by the sampling devices coupled thereto at the sampling interval. An output representative of a substantially random number may be derived from the sample values captured at the sampling interval.

23 Claims, 10 Drawing Sheets

(56) References Cited

U.S. PATENT DOCUMENTS

| | | | |
|---|---|---|---|
| 6,581,078 B1* | 6/2003 | Liardet | G06F 7/586 708/250 |
| 7,111,029 B2 | 9/2006 | Fujita et al. | |
| 8,037,117 B2* | 10/2011 | Saito | 708/256 |
| 2003/0236803 A1* | 12/2003 | Williams | G06F 7/58 708/252 |
| 2004/0193664 A1* | 9/2004 | Shimasaki | G06F 7/582 708/252 |
| 2004/0264233 A1* | 12/2004 | Fukushima | G06F 7/588 365/145 |
| 2005/0198091 A1* | 9/2005 | Saito | 708/250 |
| 2006/0069706 A1 | 3/2006 | Lazich et al. | |
| 2006/0161610 A1* | 7/2006 | Goettfert | G06F 7/582 708/250 |
| 2006/0179094 A1* | 8/2006 | Onaya | G06F 7/588 708/250 |
| 2006/0220753 A1* | 10/2006 | Boerstler et al. | 331/46 |
| 2007/0043798 A1* | 2/2007 | Boerstler et al. | 708/251 |
| 2007/0180009 A1* | 8/2007 | Gutnik | H04L 9/0861 708/250 |
| 2008/0263116 A1* | 10/2008 | Galloway | G06F 7/584 708/250 |
| 2009/0013019 A1* | 1/2009 | Tapster et al. | 708/250 |
| 2009/0077146 A1* | 3/2009 | Hars | 708/251 |
| 2009/0204656 A1* | 8/2009 | Goettfert | G06F 7/584 708/252 |
| 2010/0281088 A1* | 11/2010 | Wilber | G06F 7/588 708/251 |
| 2011/0040817 A1* | 2/2011 | Lazich et al. | 708/251 |

OTHER PUBLICATIONS

C. S. Petrie and J. A. Connelly, "Modeling and simulation of oscillator-based random number generators", Proc. ISCAS '96, vol. 4, pp. 324-327, 1996.*
Lazich et al., WO 2009/086878, machine translation, published Jul. 17, 2009.*
International Search Report for PCT/US2010/57245, mailed Dec. 16, 2011.
Written Opinion for PCT/US2010/57245, mailed Dec. 16, 2011.
Office Action for corresponding application JP2012-541117, received Nov. 25, 2014.

* cited by examiner

| Speed | Entropy (->8) | Birthday Spacing | Matrix Ranks | 6x8 Matrix Ranks | Minimum Distance Test | Random Spheres Test | The Squeeze Test | Overlapping Sums Test |
|---|---|---|---|---|---|---|---|---|
| 2000000 B/s | 8.000000 | 0.303100 | 0.238 | 0.012 | 0.837204 | 0.996991 | 0.763974 | 0.075954 |

FIG. 10

RANDOM NUMBER GENERATOR

RELATED APPLICATIONS

This application claims the benefit under 35 U.S.C. §371 of International Patent Application No. PCT/US10/57245, having an international filing date of Nov. 18, 2010, which claims priority to U.S. Provisional Application No. 61/264,625, filed Nov. 25, 2009, the contents of all of which are incorporated herein by reference in their entirety.

TECHNICAL FIELD

The present description relates generally to a system and method, generally referred to as a system, for generating random numbers, and more particularly, but not exclusively, to deriving random numbers from multiple real events, such as gate delays, response times, or relative phases.

BACKGROUND

Random number generation is utilized in a variety of technologies, such as cryptographic systems, electronic gaming devices, smart card authentication devices, and audio/video scrambling devices. In cryptographic systems, symmetric ciphers, such as the data encryption standard (DES), require a randomly selected encryption key. Public-key algorithms like Rivest Shamir Adelman (RSA), Diffie-Hellman, and Digital Signature Algorithm (DSA) require randomly generated key pairs. Furthermore, the secure sockets layer (SSL) and other cryptographic protocols use random challenges in the authentication process to foil attacks.

Due to the widespread use of random numbers, a random number generator must be robust enough such that even if the design of the random number generator is known, the random numbers generated by the random number generator cannot be predicted. Typically, a random number generator comprises an entropy generator to generate a seed that is then input into a mixing function (e.g., SHA-1, MD5 etc.). However, a large number of random number generators, utilize a deterministic process, i.e., a process whose outcome is predictable, to generate an output from an initial seed. This may be true in the case of most software embodiments of random number generators. Such random number generators, (also called pseudo-random number generators) may be easily compromised, particularly if the seed of the pseudo-random number generator is known or can be predicted.

A true random number generator uses a non-deterministic source, such as, thermal or shot noise associated with a resistor, atmospheric noise, nuclear decay, or some such unpredictable natural process, to generate random numbers. Some random number generators use a natural process, i.e. the thermal or shot noise present when electrons flow through a resistor, radioactive decay, etc. However, the random number generators of these circuits use analog circuitry that may include at least an operation amplifier and a voltage control oscillator. The use of analog circuits in the design of a random number generator makes production of the random number generator difficult. For example, due to the high voltage gain needed to amplify the thermal or shot noise, the output of the operation amplifier could become permanently saturated rendering the random number generator inoperable. In addition, these random number generators may be expensive and may not be portable.

Other random number generators may use a low frequency clocked circuit to sample the output of a linear feedback shift register (LFSR), wherein the LFSR is driven by a higher frequency free running oscillator with a random variation in the frequency to generate random numbers. However, the linear feedback shift register output sequence is inherently periodic, which makes the output of the shift register not truly random, but only pseudo-random. The duration of the period of the LFSR may be increased by using a sufficiently large number of stages in the LFSR. For example, a sixty-four bit linear LFSR running at a clock frequency of one megahertz would not repeat itself for 585,000 years. However, because the LFSR is deterministic, future and past states can be predicted when the present state of an LFSR is known.

SUMMARY

A system is described for generating random numbers. The system may include a plurality of information sources and one or more sampling devices coupled to each of the information sources. Each information source may have a characteristic which may differ from the characteristic of any other information source. The sampling devices may sample the information sources at some sampling interval. A sample value may be captured from each of the information sources by the sampling devices coupled thereto at the sampling interval. An output representative of a substantially random number may be derived from the sample values captured at the sampling interval.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 10 is a table of test result values which demonstrate the substantial randomness of the random number generator of FIG. 1.

DETAILED DESCRIPTION

Figure 1:
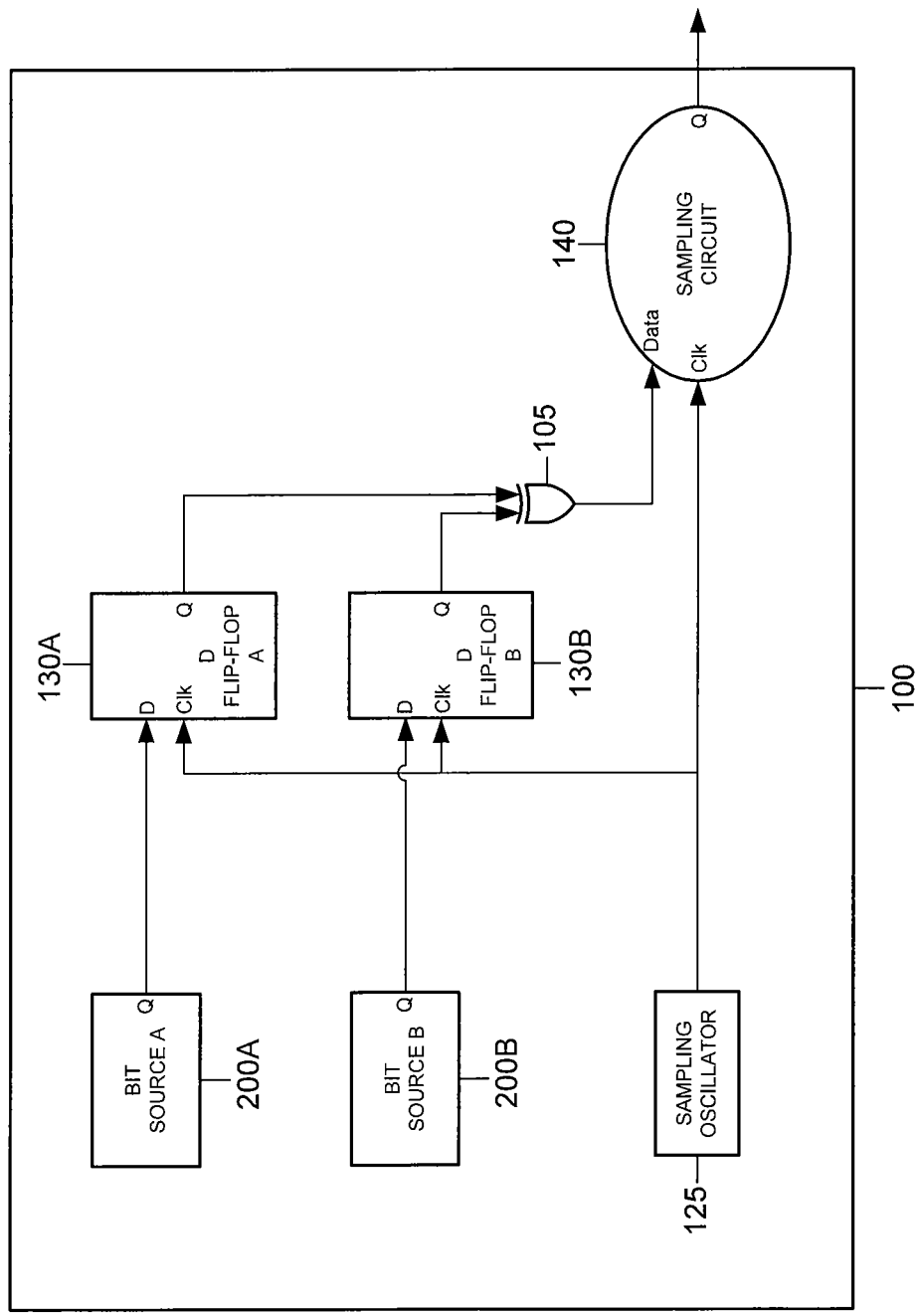
FIG. 1 is a block diagram of a random number generator.

In the disclosed embodiments, a random number generator is presented for deriving substantially random numbers from multiple real events, such as the gate delay of elements in an oscillator, a flip-flop response time, the relative phase of clocks, or generally any real event which can be measured. The real events may be measured at a sampling interval. Since the real events may be quantized, they may not be represented exactly. In one aspect, the invention may amplify the error in measurement of each real event. Since the error vector is random, a source of entropy is captured at each sampling interval, from which a random number may be derived.

In one embodiment, the random number generator may include two or more non-deterministic information sources, and one or more sampling devices, which are coupled to the information sources. The information sources may operate independently of one another. Each information source may have a unique characteristic which may affect the information gathered or provided by each information source, such that no two information sources gather or provide substantially similar information. For example, the characteristic may be the frequency at which an information source gathers or provides information, the phase at which the information source gathers or provides information, the time at which the information source gathers or provides information, the location at which the information source gathers or provides information, the method used by the information source to gather or provide information, or an aspect of the same measurement used by the information sources to gather or provide information. The one or more sampling devices may sample the information sources at some sampling intervals. The information sources may output a value to the sampling devices from which a sample value may be captured at the sampling interval. An output representative of a substantially random number may be determined based upon the sample values captured at each of the sampling intervals.

In another embodiment, the random number generator may generate substantially random numbers using inexpensive portable electronic components. The random number generator may capture a source of entropy at each sampling interval by utilizing one or more aspects of the components which may affect real events occurring within the components, such as manufacturing variability, change in the electronic components due to age and environmental factors, the sensitivity to the voltage level of the electronic components and noise which can affect circuit response. The inability to control all of these factors precisely may prevent a third party from controlling the random number generation. The random number generator may amplify each of these properties such that they are the dominant factors in deriving the substantially random numbers, thereby overcoming any possible bias that the remainder of the circuit may have in the derivation of substantially random numbers.

Other systems, methods, features and advantages may be, or may become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

Turning now to the drawings, FIG. 1 provides a block diagram of a random number generator according to one embodiment. Not all of the depicted components may be required, however, and some implementations may include additional components. Variations in the arrangement and type of the components may be made without departing from the spirit or scope of the claims as set forth herein. Additional, different or fewer components may be provided.

The random number generator 100 may include an exclusive-or (XOR) gate 105, bit sources 200A-B, D-type flip-flops 130A-B, a sampling oscillator 125, and a sampling circuit 140. The bit sources 200A-B may be non-deterministic and may be asynchronous with and independent of one another and from any other bit source in the system. In one example, the bit sources 200A-B may include a flip-flop which is driven by an oscillator to gather and/or provide information, and may also include a pseudo-random source which may create a perturbation in the operation of the flip-flop and, therefore, the information gathered and/or provided. An exemplary bit source is described in more detail in FIG. 2 below.

The sampling oscillator 125 may be an electronic circuit which produces a periodic, or aperiodic, electronic signal. Exemplary oscillators may include harmonic oscillators, relaxation oscillators, or generally any electronic or mechanical device capable of producing a periodic or aperiodic signal. For example, a harmonic oscillator may be one or more of a crystal oscillator, an RC oscillator, or generally any harmonic oscillator, while a relaxation oscillator may be one or more of a ring oscillator, a delay line oscillator, a multivbirator, or generally any relaxation oscillator. The D-type flip-flops 130A-B may be electronic circuits having two stable states and thereby capable of serving as one bit of memory. Alternatively, or in addition, the D-type flip-flops 130A-B may be other types of flip-flops such as SR-type flip-flops, T-type flip-flops, JK-type flip-flops, or generally any electronic circuit having two stable states.

The bit source A 200A may be coupled to the D-type flip-flop A 130A, and the bit source B 200B may be coupled to the D-type flip-flop B 130B. The D-type flip-flops 130A-B may be coupled to the XOR gate 105, which is coupled to the sampling circuit 140. The sampling oscillator 125 is coupled to, and provides a periodic, or aperiodic, clock signal to the D-type flip-flops 130A-B and the sampling circuit 140. An exemplary implementation of the random number generator 100 is described in FIG. 7 below.

The bit source A 200A and the bit source B 200B may have one or more unique characteristics which may cause the bit sources 200A-B to operate asynchronous with, and independent of, each other. The characteristics may also cause the bit sources 200A-B to produce a non-deterministic output. For example, the bit sources 200A-B may operate at unique frequencies, phases, times, or locations. The bit sources 200A-B may operate at a frequency and phase different from the phase and frequency of the sampling oscillator 125. The sampling oscillator 125 may be a lower frequency oscillator which operates at approximately one-fourth the frequency of the bit sources 200A-B. Alternatively, the sampling oscillator 125 may be a higher-frequency oscillator which is not phase or frequency locked with the bit sources 200A-B, but in which the clock cycle is divided by at least four. Each clock cycle of the sampling oscillator 125 may be referred to as the sampling interval.

In operation, the bit sources 200A-B may provide inputs to the D-type flip-flops 130A-B. The output (Q) of the D-type flip-flops 130A-B may flip from 0 to 1 at each clock cycle if the input (D) received from the bit sources 200A-B is 1. Alternatively, the output of the D-type flip-flops 130A-B may not change if the input received from the bit sources 200A-B is a 0. The D-type flip-flops 130A-B may provide output values, or sample values, to the XOR gate 105 at each clock cycle of the sampling oscillator 125. The XOR gate 105 may perform an exclusive-or operation on the sample values, i.e. if both of the sample values are zeros or ones, the XOR gate 105 outputs a zero, otherwise the XOR gate 105 outputs a one. The output of the XOR gate is provided to the sampling circuit 140. The sampling circuit 140 may provide the output of the XOR gate 105 at each clock cycle of the sampling oscillator 125. Since the bit sources 200A-B and the sampling oscillator 125 operate on independent and asynchronous clock signals, the bit sources 200A-B may output multiple values to the D-type flip-flops 130A-B for each value sampled from the D-type flip-flops 130A-B by the sampling circuit 140.

Figure 2:
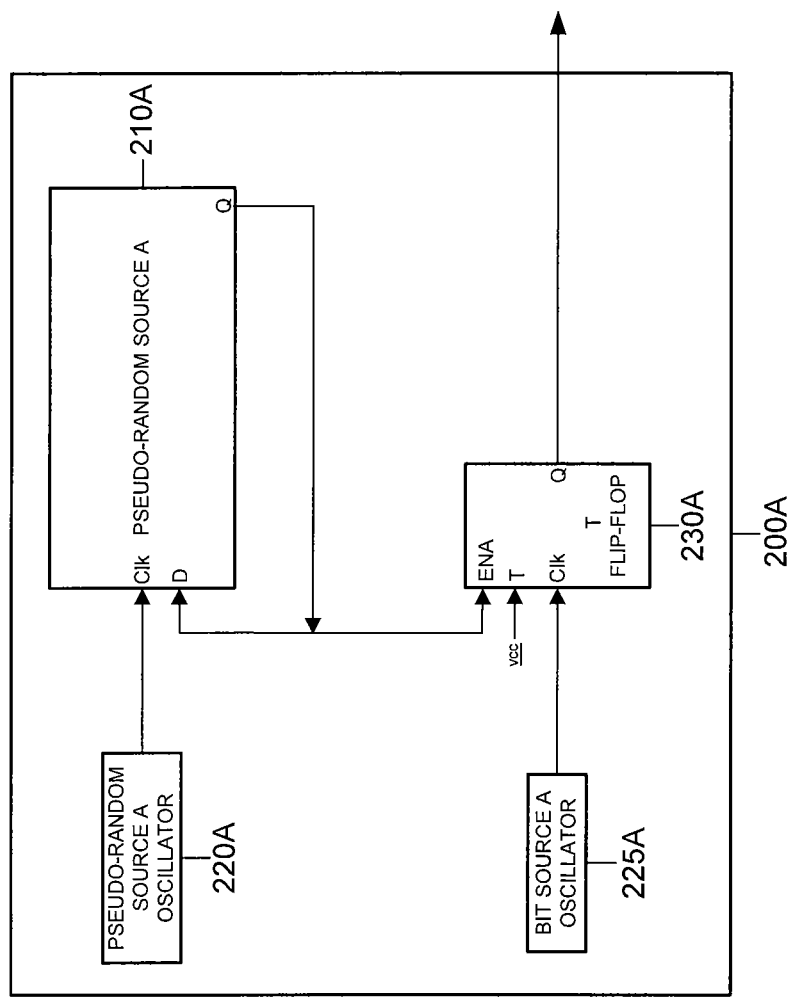
FIG. 2 is a block diagram of a bit source which can be used in the random number generator of FIG. 1 or other systems for generating random numbers.

FIG. 2 is a block diagram of a bit source 200A which can be used in the random number generator of FIG. 1 or other systems for generating random numbers. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The bit source 200A may represent the bit source A 200A in the random number generator 100 of FIG. 1 above and/or may represent the bit source B 200B in the random number generator 100 of FIG. 1 above. The bit source 200A may include a pseudo-random source A 210A, a pseudo-random source A oscillator 220A, a bit source A oscillator 225A, and a bit source A T-type flip-flop 230A. The pseudo-random source A oscillator 220A may be a periodic, or aperiodic, and may be coupled to, and provide a clock signal to, the pseudo-random source A 210A. The bit source A oscillator 225A may be periodic, or aperiodic, and may be coupled to, and provide a clock signal to the bit source a T-type flip-flop 230A. The oscillators 220A, 225A may be electronic circuits which produce a periodic, or aperiodic, electronic signal. Some exemplary oscillators may include harmonic oscillators, relaxation oscillators, or generally any electronic circuit capable of producing a signal. The bit source A T-type flip-flop 230A may be a toggle flip-flop. A toggle flip-flop may toggle the output (Q) from 0 to 1 or 1 to 0 with each clock cycle if the enable (ENA) input is asserted. The toggle flip-flop may hold the output (Q) at each clock cycle if the enable input is not asserted. The T input of the bit source A T-type flip-flop 230A may be held high.

In one example, the pseudo-random source A 210A may include one or more linear feedback shift registers (LFSR), such as Fibonacci LFSRs, Galois LFSRs, non-binary Galois LFSR, or generally any shift register. An LFSR may be a shift register whose input bit is a linear function of its previous state, referred to as a linear feedback function or a feedback function. In other words, an LFSR is a shift register whose input bit is driven by the exclusive-or (XOR) of at least a portion of the bits of the overall shift register value, referred to as the taps. The arrangement of taps for feedback in an LFSR can be expressed in finite field arithmetic as a polynomial mod 2. This means that the coefficients of the polynomial must be 1's or 0's. This is called the feedback polynomial, characteristic polynomial, or feedback function of the LFSR. For example, if the taps are at the 16th, 14th, 13th and 11th bits, the feedback function is $x16+x14+x13+x11+1$. The initial value of the LFSR may be referred to as the seed value. The linear feedback function of each LFSR should be chosen such that the LFSRs produce a sequence of bits which are substantially random and which have a very long period. For example, the period of the LFSRs may be at least 248. In the example where the bit sources 200A-B include one or more LFSRs, the feedback functions of the LFSRs may be the same or may be different.

The pseudo-random source A oscillator 220A and the bit source A oscillator 225A may be independent of each other in both frequency and phase, and therefore may be asynchronous. The pseudo-random source A oscillator 220A may operate faster than the bit source A oscillator 225A, or vice-versa. The inherent instability of the oscillators 220A, 225A may prevent the oscillators 220A, 225A from operating synchronously. For example, several factors may influence the oscillators 220A, 225A, such as external radio frequency energy, power supply noise and variations, thermal effects, age, etc. Alternatively or in addition, additional independent pseudo-random sources may be added to the bit source A 200A to compensate for any invariability of the effects of the factors on the oscillators 220A, 225A. Alternatively, or in addition, the pseudo-random source A 210A may modulate the bit source A oscillator 225A. In this example, with one hundred percent modulation, the bit source 200A may start and stop. However, with less than one hundred percent modulation, the bit source 200A may vary in frequency and/or phase.

In operation, the pseudo-random source A 210A may be configured to provide an output to the enable (ENA) of the bit source A T-type flip-flop 230A at each clock cycle of the pseudo-random source A oscillator 220A, while the bit source A T-type flip-flop 230A may be configured to output a value at each clock cycle of the bit source A oscillator 225A. If the output of the pseudo-random source A 210A is a 1, the bit source A T-type flip-flop 230A flips the output (Q) from 0 to 1 or 1 to 0 at each clock cycle of the bit source A oscillator 225A. If the output of the pseudo-random source A 210A is a 0, the bit source A T-type flip-flop 230A holds the output (Q) at the last outputted state. Thus, the pseudo-random source A 210A may perturb the operation of the bit source A T-type flip-flop A 230A by determining when the bit source A T-type flip-flop 230 should or should not toggle states. A waveform diagram illustrating the outputs of the oscillators 220A, 225A, the pseudo-random source A 210A, and the pseudo-random source A T-type flip-flop A 230A is discussed in FIG. 9 below.

Figure 3:
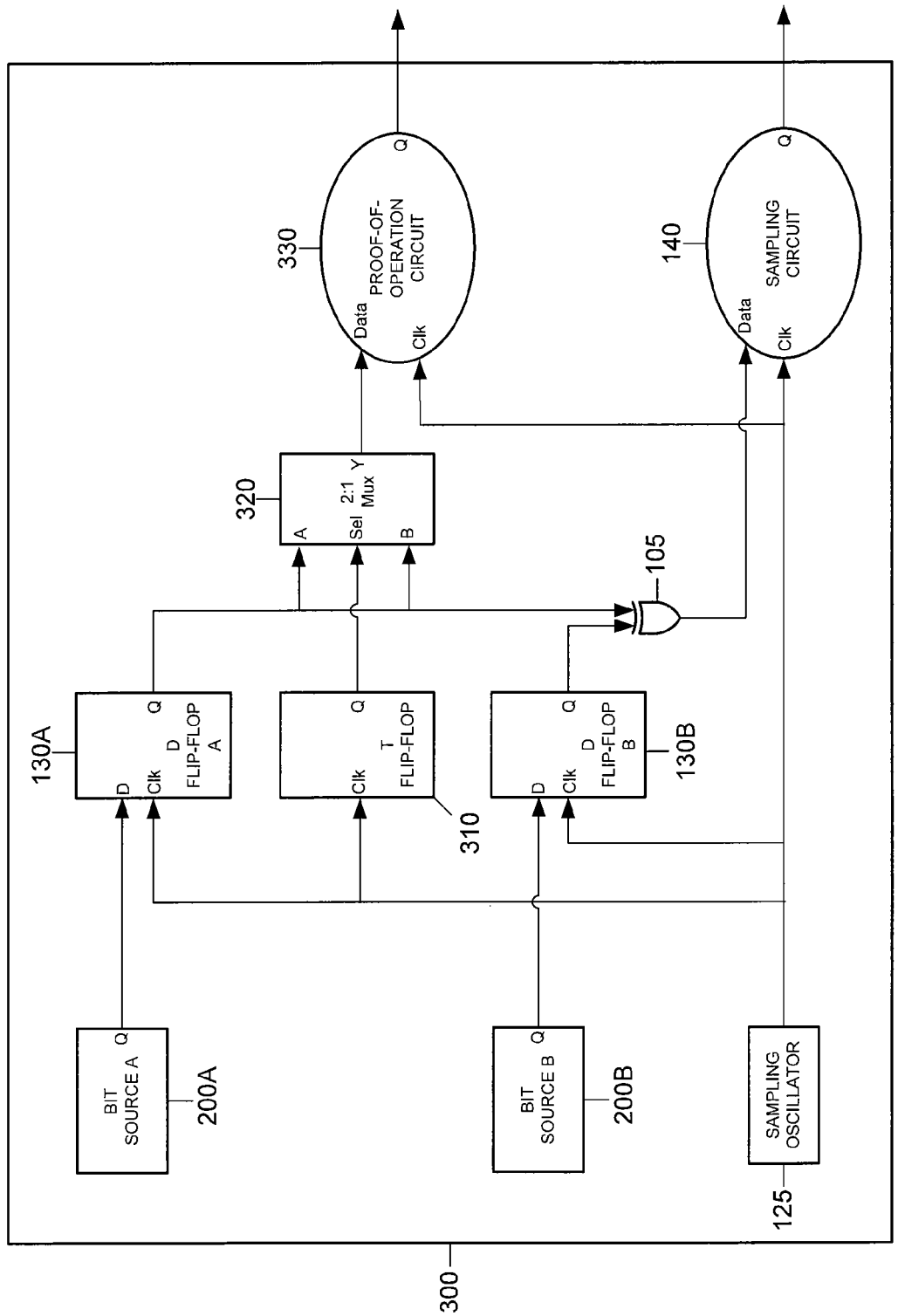
FIG. 3 is a block diagram of a proof-of-operation system which can be used to verify the functionality of the random number generator of FIG. 1, or other systems for generating random numbers.

FIG. 3 is a block diagram of a proof-of-operation system 300 which can be used to verify the functionality of the random number generator of FIG. 1, or other systems for generating random numbers. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The system 300 may include the components of FIG. 1, such as the bit sources 200A-B, the D-type flip-flops 130A-B, the sampling oscillator 125, and the sampling circuit 140.

The system 300 may also include the T-type flip-flop 310, the multiplexer 320, and the proof-of-operation circuit 330. The bit sources 200A-B may be individually coupled to the D-type flip-flops 130A-B. The D-type flip-flops 130A-B may each provide an input to the multiplexer 320. The multiplexer 320 may be a 2:1 multiplexer, receiving one input from the D-type flip-flop A 130A, and one input from the D-type flip-flop B 130B. The multiplexer 320 is driven at half of the clock rate due to the T-type flip-flop 310.

In operation, the multiplexer 320 provides an output to the proof-of-operation circuit 330 based on the input (Sel) received from the T-type flip-flop 310. The proof-of-operation circuit 330 outputs one bit at a time from each of the D-type flip-flops 130A-B. Since the multiplexer 320 is driven at half of the clock rate of the sampling oscillator 125, the proof-of-operation circuit 330 may not output the entire stream from either of the D-type flip-flops 130A-B. Thus, a third party observer may be unable to determine the combined value of the outputs of the D-type flip-flops 130A-B. However, if every other bit output by the proof-of-operation circuit 330 is either a 0, or a 1, a third party observer may be able to determine that at least one of the bit sources 200A-B is outputting the same value, and therefore the system may no longer be providing a substantially random number.

Figure 4:
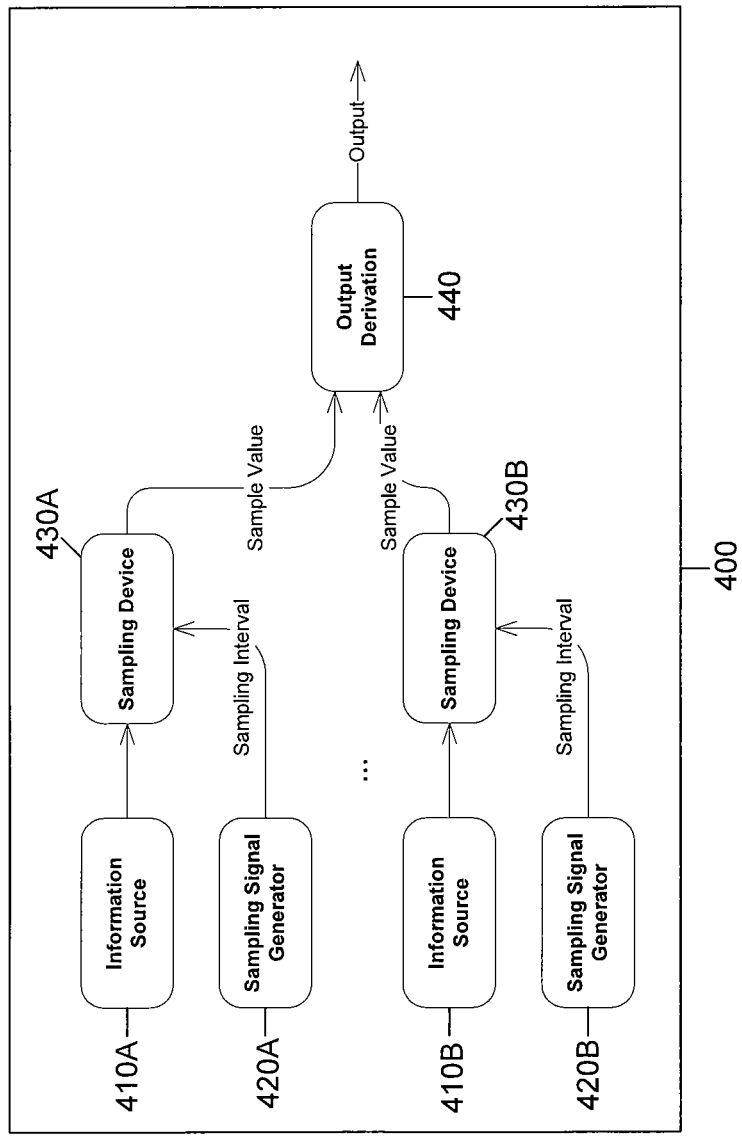
FIG. 4 is a block diagram illustrating the operation of the random number generator of FIG. 1 with multiple sampling signal generators, or other systems for generating random numbers.

FIG. 4 is a block diagram 400 illustrating the operation of the random number generator of FIG. 1 with multiple sampling signal generators, or other systems for generating random numbers. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The block diagram 400 may include information sources 410A-B, sampling signal generators 420A-B, sampling devices 430A-B, and an output derivation 440. The information sources 410A-B may each have a unique characteristic which may affect the information gathered or provided by each information source 410A-B, such that the information sources 410A-B do not gather or provide information in a substantially similar way. The unique characteristics may also ensure that the information sources 410A-B operate asynchronous with, and independent of, one another. For example, the characteristic may be the frequency at which an information source gathers or provides information, the phase at which the information source gathers or provides information, the time at which the information source gathers or provides information, the location at which the location source gathers or provides information, the method used by the information source to gather or provide information, or an aspect of the same measurement used by the information sources to gather or provide information. The sampling signal generators 420A-B may be periodic or aperiodic, and may operate at different frequencies and/or phases from one another.

The information sources 410A-B may provide values to the sampling devices 430A-B at periodic or aperiodic intervals. The sampling devices 430A-B may output sample values taken from the information sources 410A-B at intervals determined by the sampling signal generators 420A-B. The output derivation 440 may derive a substantially random number from the sample values received from the sampling devices 430A-B. For example, the output derivation 440 may perform an exclusive-or operation on the sample values. Generally the output derivation may perform any operation on the sample values to derive a substantially random number. Since the output derivation is derived from two distinct sources of entropy, the derived output may be a substantially random number, or true random number.

Figure 5:
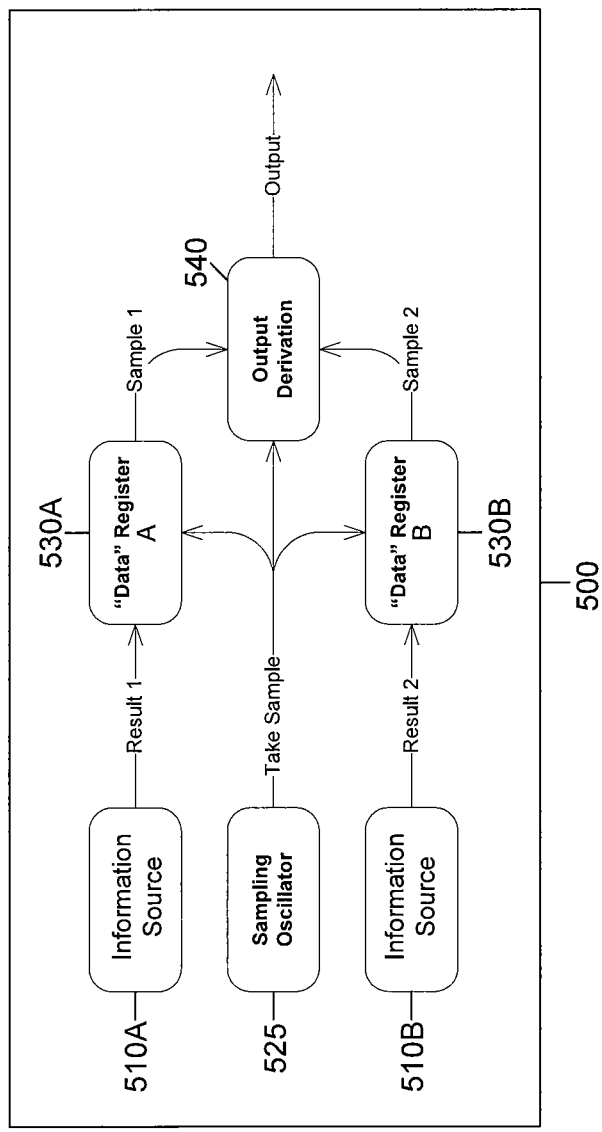
FIG. 5 is a block diagram illustrating the random number generator of FIG. 1 with one sampling oscillator, or other systems for generating random numbers.

FIG. 5 is a block diagram 500 illustrating the random number generator of FIG. 1 with one sampling oscillator, or other systems for generating random numbers. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The block diagram 500 may include information sources 510A-B, data registers 530A-B, sampling oscillator 525, and output derivation 540. The information sources 510A-B may each have one or more unique characteristics as previously discussed. The information sources 510A-B may be non-deterministic and may operate asynchronous with, and independent of, each other. The information sources 510A-B may also operate at different frequencies and/or phases than the sampling oscillator 525. The sampling oscillator 525 may be periodic or aperiodic. In operation, the information sources 510A-B may provide results to the data registers 530A-B. The results may be provided at unique frequencies and/or phases. The data registers 530A-B may provide sample values, based on the results, to the output derivation 540 at an interval determined by the sampling oscillator 525. The output derivation may perform an operation on the samples provided by the data registers 530A-B to derive a substantially random number at intervals determined by the sampling oscillator 525.

Figure 6:
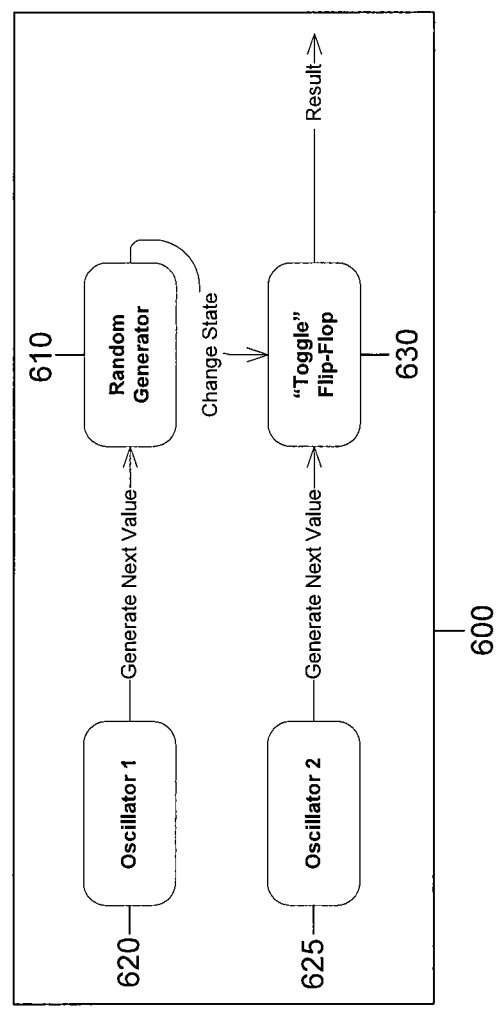
FIG. 6 is a block diagram illustrating the operation of the bit source of FIG. 2, or other systems for generating random numbers.

FIG. 6 is a block diagram 600 illustrating the operation of the bit source of FIG. 2, or other systems for generating random numbers. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The block diagram 600 may include oscillator 1 620, oscillator 2 625, random generator 610, and toggle flip-flop 630. The oscillator 1 620 and the oscillator 2 625 may operate at unique frequencies and/or phases and may be periodic or aperiodic. The oscillator 1 620 may provide a signal to the random generator 610 to generate a next value. Upon receiving the signal from the oscillator 1 620, the random generator 610 may output a change state signal to the toggle flip-flop 630. The toggle flip-flop 630 may then change states upon receiving the signal from the random generator 610. The toggle flip-flop 630 may output its state upon receiving a generate next value signal from the oscillator 2 625. Thus, the toggle flip-flop 630 may be continuously changing its state but may only output its state upon receiving the generate next value from the oscillator 2 625.

Alternatively or in addition, the random generator 610 may output an enable signal to the toggle flip-flop 630. In this example, the toggle flip-flop 630 may toggle its state at each cycle of the oscillator 2 625, if the input from the random generator 610 is a 1. If the input received from the random generator 610 is a 0, the toggle flip-flop 630 may hold its state. The toggle flip-flop 630 may output its state upon receiving a generate next value signal from the oscillator 2 625.

Figure 7:
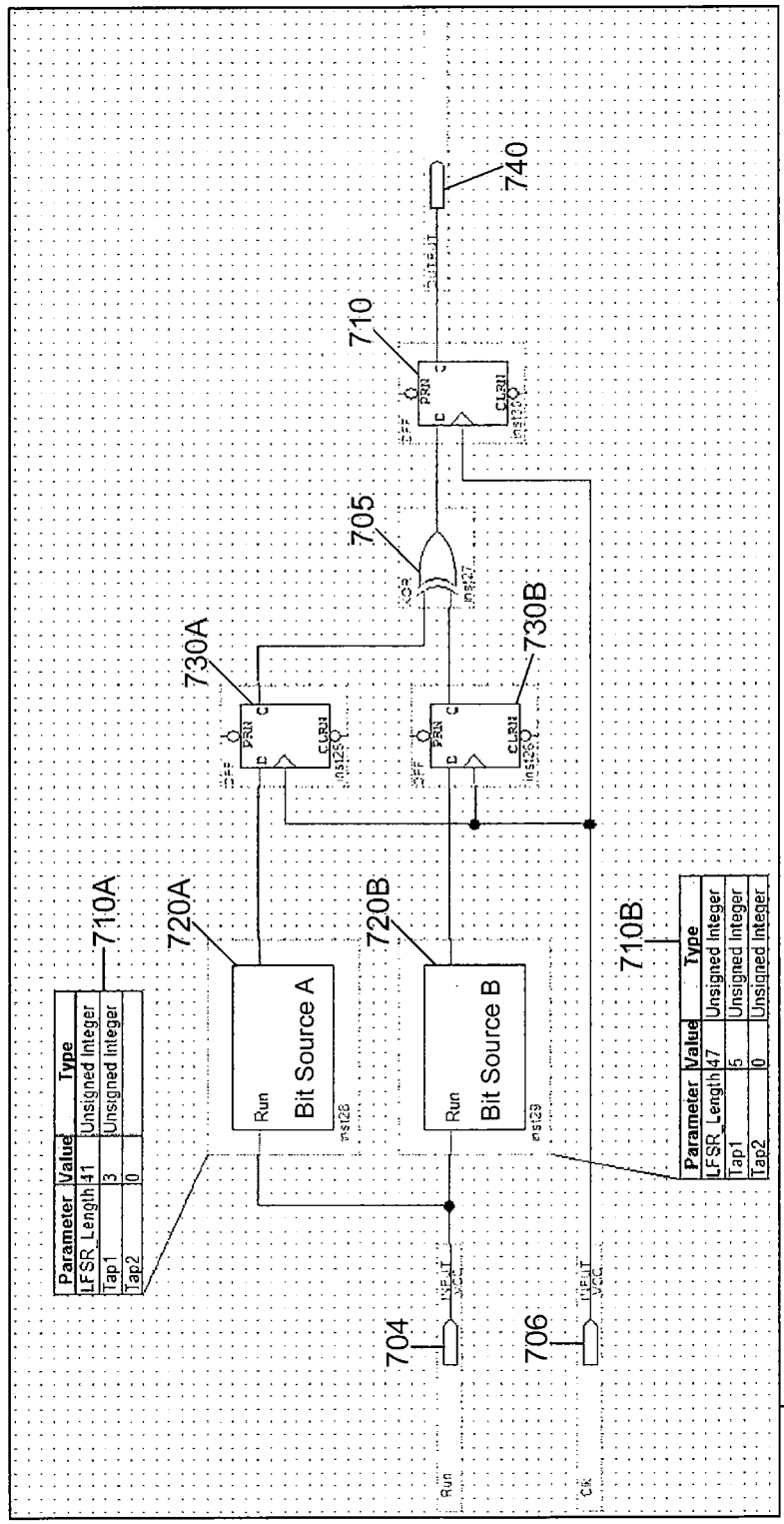
FIG. 7 is a block diagram illustrating an implementation of the random number generator of FIG. 1.

FIG. 7 is a block diagram 700 illustrating an implementation of the random number generator of FIG. 1. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The block diagram 700 may include input signals 704, 706, bit sources 720A-B, LFSR tables 710A-B, D-type flip-flops 730A-B, XOR gate 705, D-type flip-flop 710, and output 740. The LFSR tables 710A-B may describe the lengths and taps of the LFSRs utilized by the bit sources 720A-B. The taps may be the bit positions in the LFSR which affect the next state of the LFSR, while the rightmost bit of the LFSR may be referred to as the output bit of the LFSR. The LFSR may perform exclusive-or operations on the output and the taps and may feed the result back into the leftmost bit of the LFSR. The bit fed into the leftmost bit of the LFSR is referred to as the input bit. For example, the LFSR utilized by the bit source A 720A may have a length of 41 and may use taps 3 and 0, while the LFSR used by the bit source B 720B may have a length of 47 and may use taps 5 and 0. The bit sources 720A-B may be non-deterministic and may operate asynchronous with, and independent of, one another. The non-deterministic outputs of the bit sources 720A-B are discussed in more detail in FIG. 8 below.

In operation, the input signal 704 may provide a run signal to the bit sources 720A-B. The bit sources 720A-B may asynchronously provide values to the D-type flip-flops 730A-B. The input signal 706 may provide a clock signal to the D-type flip-flops 730A-B. The D-type flip-flops 730A-B may output values to the XOR gate at intervals determined by the input signal 706. The XOR gate 705 may perform an exclusive-or operation on the values received from the flip-flops 730A-B and may output the result to the D-type flip-flop 710. The D-type flip-flop 710 may output a value at intervals determined by the input signal 706. The output of the D-type flip-flop 710, which is representative of a substantially random number, may be tested at the output 740.

Figure 8:
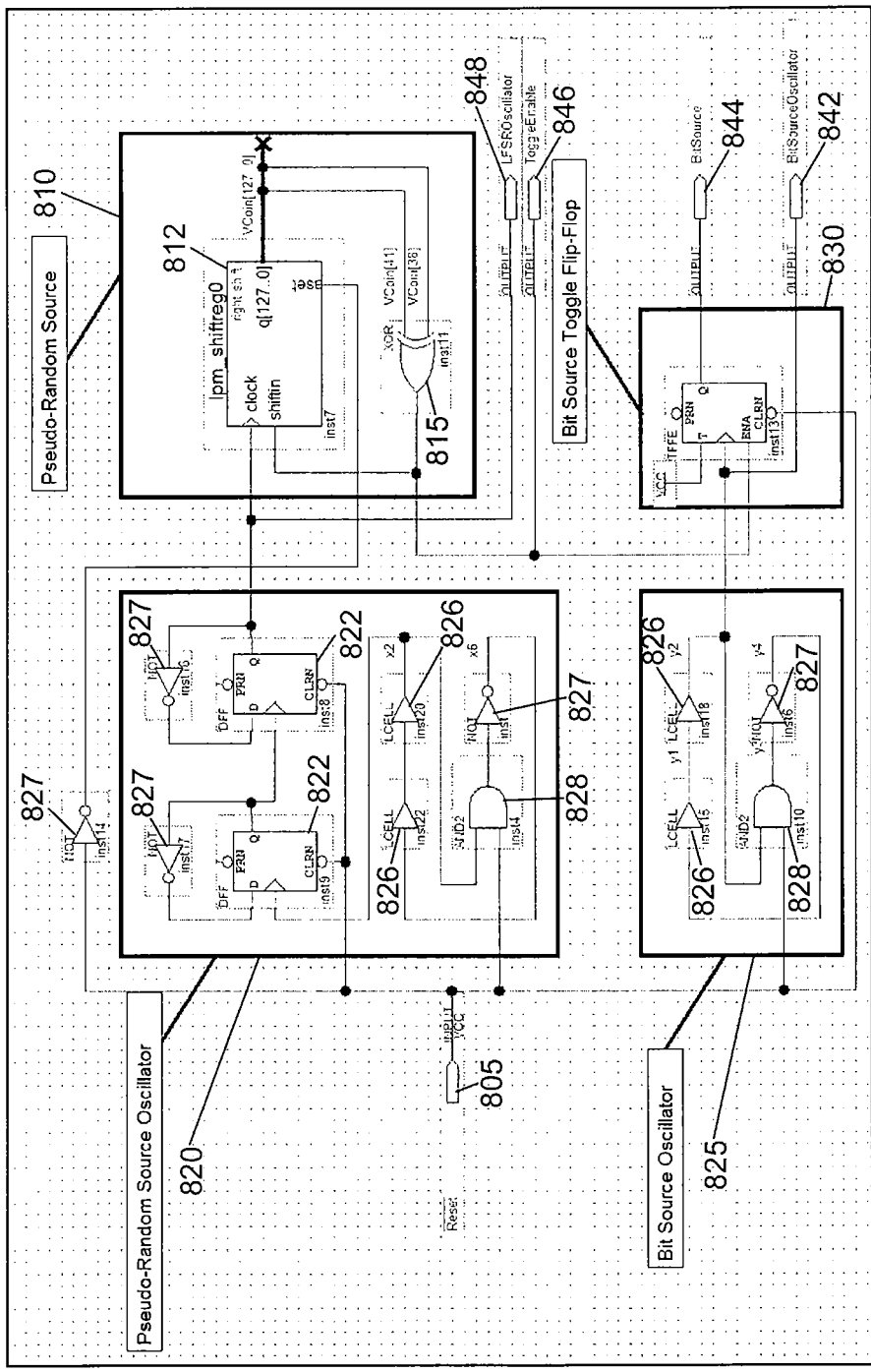
FIG. 8 is a block diagram illustrating an implementation of the bit source of FIG. 2.

FIG. 8 is a block diagram 800 illustrating an implementation of the bit source of FIG. 2. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The block diagram 800 may include a input signal 805, a pseudo-random source 810, a pseudo-random source oscillator 820, a bit source oscillator 825, a bit source toggle flip-flop 830, a NOT gate 827, and outputs 842, 844, 846, 848. The pseudo-random source 810 may include an LFSR 812, and an XOR gate 815. The pseudo-random source oscillator 820 may include NOT gates 827, D-type flip-flops 822, LCELLs 826, or logic cells 826, and AND gates 828. The bit source oscillator 825 may include LCELLs 826, NOT gate 827 and AND gate 828.

In operation, the input signal 805 may provide a signal to the bit source oscillator 825 and the pseudo-random source oscillator 820. The bit source oscillator 825 may operate four times faster than the pseudo-random source oscillator 820 due to the inclusion of the D-type flip-flops 822 in the pseudo-random source oscillator 820. The bit source oscillator 825 may send a signal to the bit source toggle flip-flop 830. The bit source toggle flip-flop 830 may initially output a 1 until receiving an enable signal (ENA) from the pseudo-random source 810. The pseudo-random source oscillator 820 may provide a signal to the pseudo-random source 810.

The received signal may cause the LFSR 812 to change states. As previously mentioned, the change in states in the LFSR 812 may be based on the length and taps of the LFSR 812 may be 41 and 38. The LFSR 812 may have a substantially large number of states such that the LFSR 812 does not repeat states for a substantially long period of time.

The output of taps 41 and 38 are provided to the XOR gate 815. The XOR gate 815 performs an exclusive-or operation on the taps and provides the output as shiftin input to the LFSR, and as an enable (ENA) input to the bit source toggle flip-flop 830. If the enable (ENA) input is 1, the bit source toggle flip-flop 830 may start toggling its output from 1 to 0 or 0 to 1 at each clock cycle of the bit source oscillator 825. For example, the bit source toggle flip-flop 830 may toggle its output millions of times per second when enabled. If the enable (ENA) input is a 0, the bit source toggle flip-flop 830 may hold its current output at 0 or 1.

The enable (ENA) input of the bit source toggle flip-flop 830 can be tested at output 846, while the output of the bit source toggle flip-flop 830 can be tested at the output 844. The output of the bit source oscillator 825 may be tested at the output 842, while the output of the pseudo-random source oscillator 820 may be tested at the output 848. Exemplary values of the outputs 842, 844, 846, 848 are shown in FIG. 9 below.

In another embodiment, the LFSR 812 may select one of two separate bit source oscillators 825. The separate bit source oscillators 825 may operate at different frequencies and/or phases. Alternatively, or in addition, the LFSR 812 may select one of two different speeds for the bit source oscillator 825, or may otherwise modulate the bit source oscillator 825.

Figure 9:
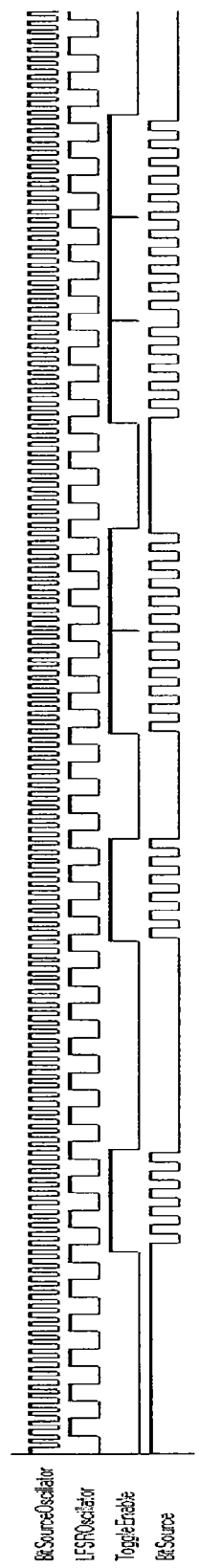
FIG. 9 is a timing chart illustrating an exemplary operation of the bit source implementation of FIG. 8.

FIG. 9 is a timing chart illustrating an exemplary operation of the bit source implementation of FIG. 8. The BitSourceOscillator waveform of the timing chart represents the output 842 of the bit source oscillator 825 of FIG. 8. The LFSROscillator waveform represents the output 848 of the pseudo-random source oscillator 820 of FIG. 8. The ToggleEnable waveform represents the output 846 of the pseudo-random source 810, which is also the enable (ENA) input of the bit source toggle flip-flop 830. The BitSource waveform represents the output 844 of the bit source toggle flip-flop 830 of FIG. 8.

The timing chart illustrates that bit source oscillator 825 runs at four times the speed of the pseudo-random source oscillator 820. The timing chart also illustrates that ToggleEnable value determines when the bit source toggle flip-flop 830 starts or stops toggling its state from 0 to 1 or 1 to 0 at each clock cycle. When the ToggleEnable value is 1, the bit source toggle flip-flop 830 changes it state from 0 to 1 or 1 to 0 at each clock cycle. However, when the ToggleEnable value is 0, the bit source toggle flip-flop 830 holds its last output value. Testing has shown that each time the input signal 805 is taken low and then high again, the output 844 of the bit source toggle flip-flop 830 is substantially different. Thus, the output 844 of the toggle flip-flop 830 is non-deterministic, and may be asynchronous with, and independent of, the toggle flip-flop of any other bit source in the system. Furthermore, if the phase of the system is altered by a substantially small amount of time, such as one pico-second, the outputs of the ToggleEnable and the BitSource may vary substantially. Thus, the system may have a high level of criticality.

FIG. 10 is a table of test result values which demonstrate the substantial randomness of the random number generator of FIG. 1. The table of FIG. 10 lists results of tests which determine the quality of random numbers. The test results of FIG. 10 demonstrate the substantial randomness of the random number generator 100 as further explained below.

The quality of numbers generated by the random number generator 100 may be measured in a variety of ways. One method may be to compute the information density, or entropy, in a series of numbers generated by the random number generator 100. The higher the entropy in the series of numbers is, the more difficult it may be to predict a given number on the basis of the preceding numbers in the series. A sequence of good random numbers may have a high level of entropy, although a high level of entropy may not guarantee randomness.

The entropy value in FIG. 10 represents the information density of random numbers generated by the random number generator 100, expressed as a number of bits per character. The birthday spacing test result of FIG. 10 is determined by performing a birthday spacing test on a sequence of random bits generated by the random number generator 100. The birthday spacing test is often performed by choosing random points on a large interval of a sequence of random bits generated by the random number generator 100. The spacings between the points should be asymptotically Poisson distributed for a substantially random sequence.

The matrix ranks and 6×8 matrix ranks test results of FIG. 10 are determined by performing one or more random binary matrix rank tests on a sequence of random bits generated by the random number generator 100. The matrix ranks tests are often performed by selecting some number of bits from the sequence of random numbers to form a matrix over {0,1}. The rank of the matrix is then determined, and the ranks are counted. The focus of the random binary matrix rank test is the rank of disjoint sub-matrices of the entire sequence of bits. The purpose of the random binary matrix rank test is to check for linear dependence among fixed length substrings of the original sequence of bits generated by the random number generator 100.

The minimum distance test result of FIG. 10 is determined by performing a minimum distance test on a sequence of random bits generated by the random number generator 100. The minimum distance test is often performed by randomly placing 8,000 points in a 10,000×10,000 square, and then finding the minimum distance between the pairs. The square of the distance should be exponentially distributed with a certain mean for a substantially random sequence of bits.

The random spheres test result of FIG. 10 is determined by performing a random sphere test on a sequence of random bits generated by the random number generator 100. The random spheres test is often performed by randomly choosing 4,000 points in a cube of edge 1,000. A sphere is centered on each point, whose radius is the minimum distance to another point. The smallest sphere's volume should be exponentially distributed with a certain mean for a substantially random sequence of numbers.

The squeeze test result of FIG. 10 is determined by performing a squeeze test on a sequence of random numbers generated by the random number generator 100. The squeeze test is often performed by multiplying $2^{31}$ by random floats on [0,1) until 1 is reached. The multiplying is repeated 100,000 times. The number of floats needed to reach 1 should follow a certain distribution for a substantially random sequence of numbers.

The overlapping sums test result of FIG. 10 is determined by performing an overlapping sums test on a sequence of random numbers generated by the random number generator 100. The overlapping sums test is often performed by generating a long sequence of random floats on [0,1) and adding sequences of 100 consecutive floats. The resulting sums should be normally distributed with characteristic mean and sigma for a substantially random sequence of numbers.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A digital system for generating a random number, comprising:

a plurality of digital information sources, each digital information source comprising a characteristic, wherein the characteristic of each digital information source differs from the characteristic of any other digital information source, wherein at least one of the digital information sources includes a first clock source, a second clock source, a pseudo random number generator, and a sampling device, wherein the pseudo random number generator is configured to generate a pseudo random number responsive to the first clock source, and output a signal to the sampling device, wherein the second clock source is input into the sampling device and causes the sampling device to output a sampled version of the signal output from the pseudo random number generator;

one or more second sampling devices coupled to each of the plurality of digital information sources, wherein the one or more second sampling devices sample the sampled version of the signal output from the pseudo random number generator for each of the plurality of digital information sources at one or more sampling intervals; and wherein a sample value is captured from each of the digital information sources, including the sampled version of the signal output from the pseudo random number generator by the one or more second sampling devices coupled thereto at the one or more sampling intervals, and an output is determined based on the sample values, the output being representative of a substantially random number.

2. The system of claim 1 wherein the characteristic of each of the plurality of digital information sources comprises a frequency at which each of the plurality of digital information sources gathers or provides information.

3. The system of claim 1 wherein the characteristic of each of the plurality of digital information sources comprises a phase at which each of the plurality of digital information sources gathers or provides information.

4. The system of claim 1 wherein the characteristic of each of the plurality of digital information sources comprises a time at which each of the plurality of digital information sources gathers or provides information.

5. The system of claim 1 wherein the characteristic of each of the plurality of digital information sources comprises a location at which each of the plurality of digital information sources gathers or provides information.

6. The system of claim 1 wherein the characteristic of each of the plurality of digital information sources comprises a voltage at which each of the plurality of digital information sources gathers or provides information.

7. The system of claim 1 wherein the characteristic of each of the plurality of digital information sources comprises a method used by each of the plurality of digital information sources to gather or provide information.

8. The system of claim 1 wherein the characteristic of each of the plurality of digital information sources is dependent on parameters of components of each digital information source.

9. The system of claim 1 wherein at least one of the plurality of digital information sources gather or provides information at a time that is dependent on at least one of a gate delay, a relative phase, or a response time of components of the at least one digital information source.

10. The system of claim 1 wherein at least one of the one or more second sampling devices comprises a flip-flop.

11. The system of claim 1 wherein a status signal is outputted for determining whether the system is functioning correctly.

12. A system for generating a random number, comprising:
a plurality of oscillators, each of the plurality of oscillators comprising a plurality of cycles, wherein each of the plurality of oscillators operates at a frequency or a phase different from a frequency or a phase at which each other of the plurality of oscillators operates;
a plurality of pseudo-random generators, each pseudo-random generator being coupled to a first respective one of the plurality of oscillators, wherein each of the plurality of pseudo-random generators comprises a state which changes at each of the plurality of cycles of the oscillator coupled thereto, and each of the plurality of pseudo-random generators comprises a pseudo-random output which changes independent of a change of the state;
a plurality of first flip-flops, each of the plurality of first flip-flops comprising a clock signal coupled to a second respective one of the plurality of oscillators, and each of the plurality of first flip-flops comprising an enable signal coupled to the pseudo-random output of one of the plurality of pseudo-random generators, wherein a state of each of the plurality of flip-flops changes at each of the plurality of cycles of the oscillator coupled thereto if the enable signal of each of the plurality of first flip-flops is asserted, and the state of each of the plurality of flip-flops does not change at each of the plurality of cycles of the oscillator coupled thereto if the enable signal of each of the plurality of first flip-flops is de-asserted; and
a plurality of second flip-flops, wherein an input of each of the plurality of second flip-flops is coupled to a third respective one of the plurality of first flip-flops, and a clock input of each of the plurality of second flip-flops is coupled to one of the plurality of oscillators;
wherein, upon receiving a first signal from the oscillator coupled thereto, each of the plurality of pseudo-random generators output the pseudo-random output to the enable signal each of the plurality of first flip-flops coupled thereto, each of the plurality of first flip-flops outputs a value indicative of the state of each of the plurality of first flip-flops to the input of each of the plurality of second flip-flops coupled thereto, and upon receiving a second signal from the oscillator coupled thereto, each of the plurality of second flip-flops outputs a second value based on the value outputted by each of the plurality of first flip-flops coupled thereto;
further wherein a substantially random output is determined based on the second value outputted by each of the plurality of second flip-flops at a time determined by an oscillator of the plurality of oscillators coupled thereto.

13. The system of claim 12 wherein each of the plurality of oscillators comprises a periodic oscillator or an aperiodic oscillator.

14. The system of claim 12 wherein each of the plurality of oscillators is coupled to only one of the plurality of pseudo-random generators, one of the plurality of first flip-flops or one of the plurality of second flip-flops.

15. The system of claim 12 wherein the plurality of first flip-flops comprise a plurality of toggle-type flip-flops.

16. The system of claim 12 wherein the plurality of second flip-flops comprise a plurality of D-type flip-flops.

17. The system of claim 12 wherein at least one of the plurality of pseudo-random number generators modulates the oscillator coupled thereto.

18. A method for generating random numbers digitally, the method comprising:
sampling a plurality of digital information sources at one or more sampling intervals by one or more first sampling devices coupled to each of the plurality of digital information sources to obtain a plurality of sample values, each digital information source comprising a characteristic, wherein the characteristic of each digital information source differs from the characteristic of any other digital information source, wherein at least one of the digital information sources includes a first clock source, a second clock source, a pseudo random number generator, and a second sampling device, wherein the pseudo random number generator is configured to generate a pseudo random number responsive to the first clock source, and output a signal to the second sampling device, wherein the second clock source is input into the second sampling device and causes the second sampling device to output a sampled version of the signal output from the pseudo random number generator;
determining an output based on the plurality of sample values obtained at the one or more sampling intervals, wherein the output is representative of a substantially random number.

19. The method of claim 18 wherein the characteristic of each digital information source comprises gathers or provides information at a time that is dependent on at least one of a frequency at which each digital information source gathers or provides information, a phase at which each digital information source gathers or provides information, a location at which each digital information source gathers or provides information, a voltage at which each digital information source gathers or provides information, a method used by each digital information source to gather or provide information, or an aspect of a same measurement used by each of the digital information sources to gather or provide information.

20. The method of claim 18 wherein at least one of the plurality of digital information sources gathers or provides information at a time that is dependent on at least one of a gate delay, a relative phase, or a response time.

21. A digital system for generating random numbers, the system comprising:

means for sampling a plurality of digital information sources at one or more sampling intervals to obtain a plurality of sample values, each digital information source comprising a characteristic, wherein the characteristic of each digital information source differs from the characteristic of any other digital information source, wherein at least one of the digital information sources includes a first clock source, a second clock source, a pseudo random number generator, and a sampling device, wherein the pseudo random number generator is configured to generate a pseudo random number responsive to the first clock source, and output a signal to the sampling device, wherein the second clock source is input into the sampling device and causes the sampling device to output a sampled version of the signal output from the pseudo random number generator; and means for determining an output based on the plurality of sample values obtained at the one or more sampling intervals, wherein the output is representative of a substantially random number.

22. The system of claim 21 wherein the characteristic of each digital information source comprises at least one of a frequency at which each digital information source gathers or provides information, a phase at which each digital information source gathers or provides information, a time at which each digital information source gathers or provides information, a location at which each digital information source gathers or provides information, a voltage at which each digital information source gathers or provides information, a method used by each digital information source to gather or provide information, or an aspect of a same measurement used by each of the digital information sources to gather or provide information.

23. The system of claim 21 wherein at least one of the plurality of digital information sources is based on at least one of a gate delay, a relative phase, or a response time.

* * * * *